Feb. 6, 1934.   C. L. HUNSICKER   1,945,940
OPHTHALMOLOGICAL INSTRUMENT
Filed Jan. 4, 1932   8 Sheets-Sheet 1
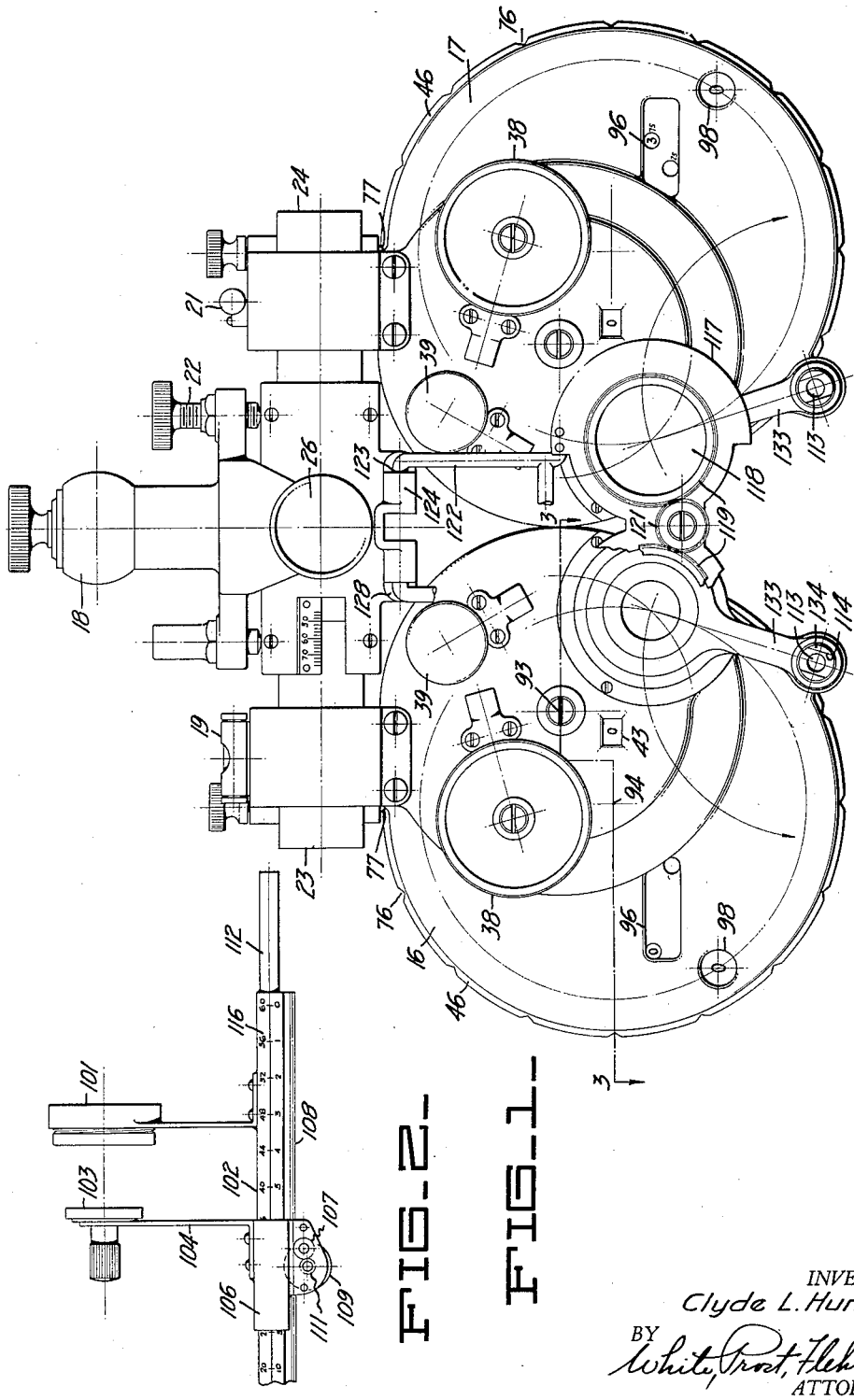
INVENTOR.
Clyde L. Hunsicker
BY White, Prost, Hehr & Lothrop
ATTORNEYS.

Feb. 6, 1934.  C. L. HUNSICKER  1,945,940
OPHTHALMOLOGICAL INSTRUMENT
Filed Jan. 4, 1932   8 Sheets-Sheet 2
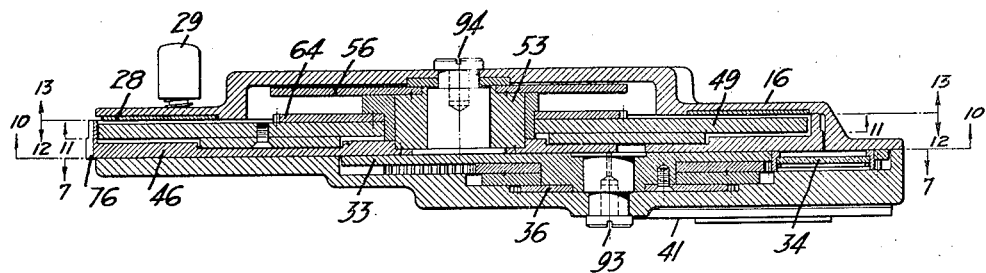
FIG_3_
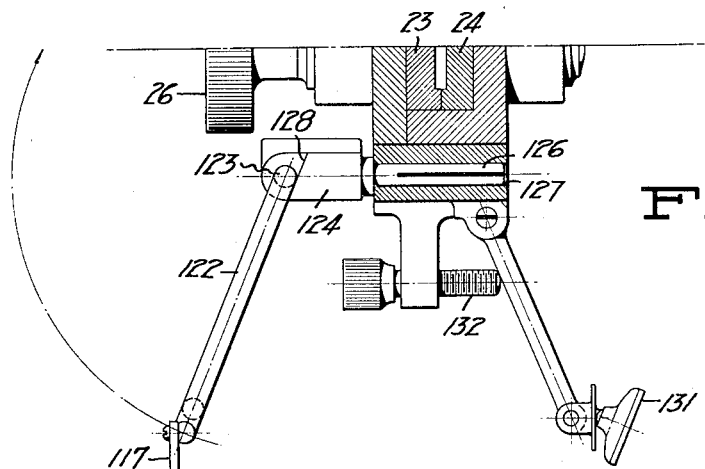
FIG_4_
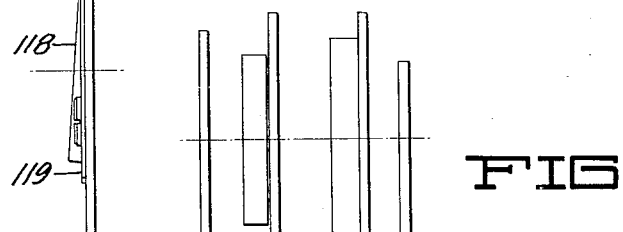
FIG_5_
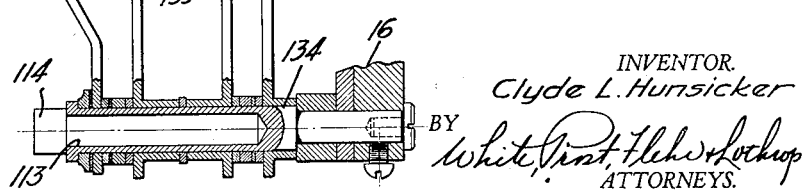
INVENTOR.
Clyde L. Hunsicker
BY
ATTORNEYS.

Feb. 6, 1934.    C. L. HUNSICKER    1,945,940
OPHTHALMOLOGICAL INSTRUMENT
Filed Jan. 4, 1932    8 Sheets-Sheet 3
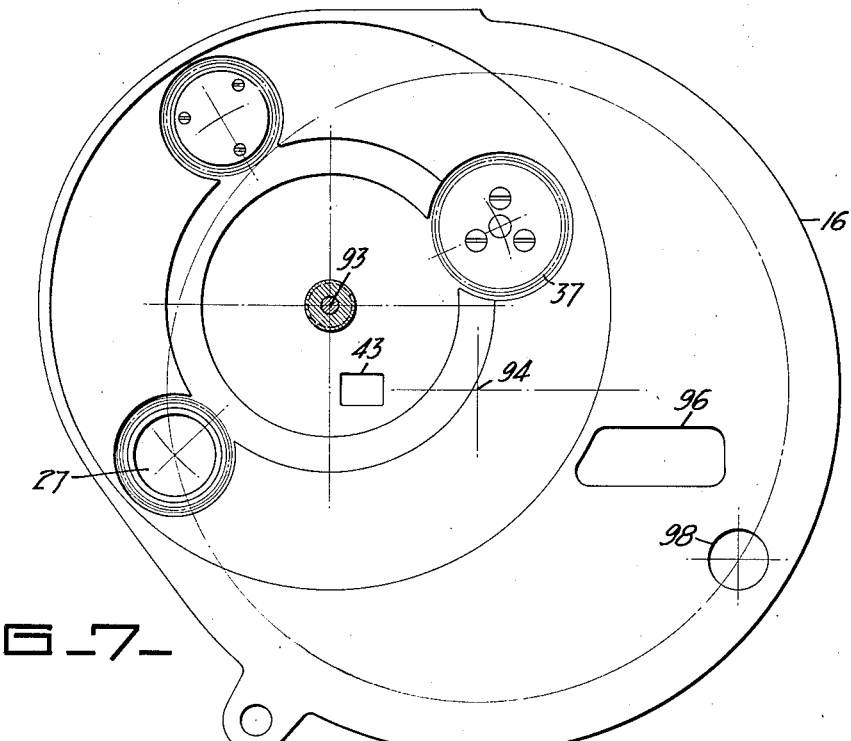
FIG_7_
FIG_6_
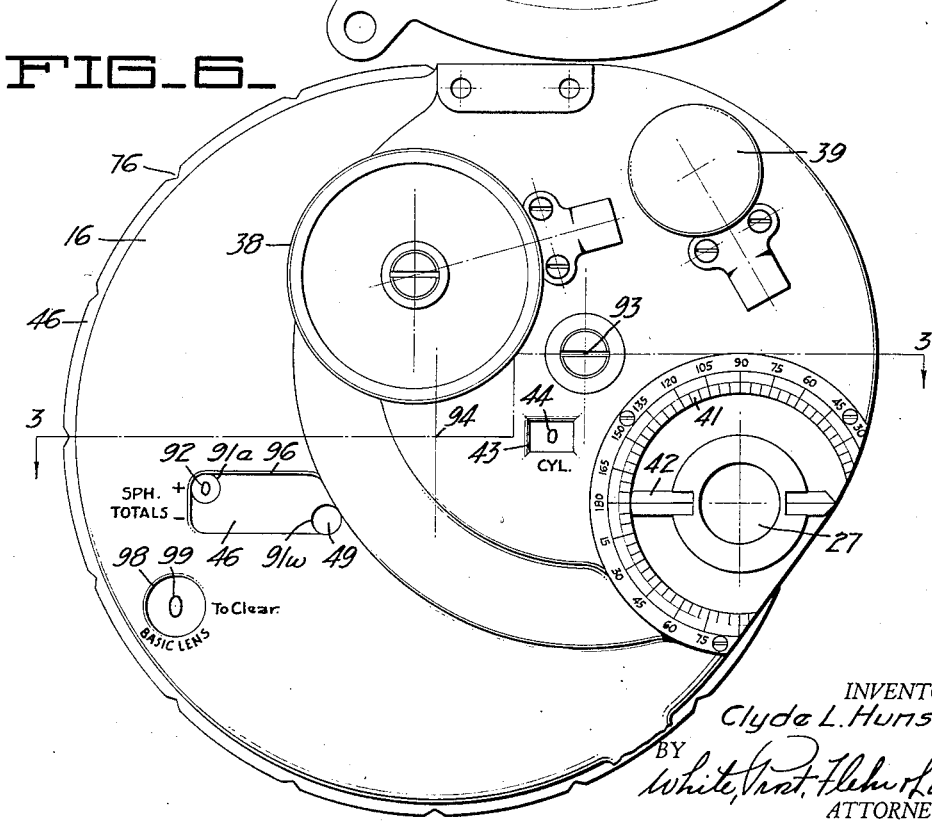
INVENTOR.
Clyde L. Hunsicker
BY
White, Prost, Fehr & Lothrop
ATTORNEYS.

Feb. 6, 1934.     C. L. HUNSICKER     1,945,940
OPHTHALMOLOGICAL INSTRUMENT
Filed Jan. 4, 1932     8 Sheets-Sheet 4
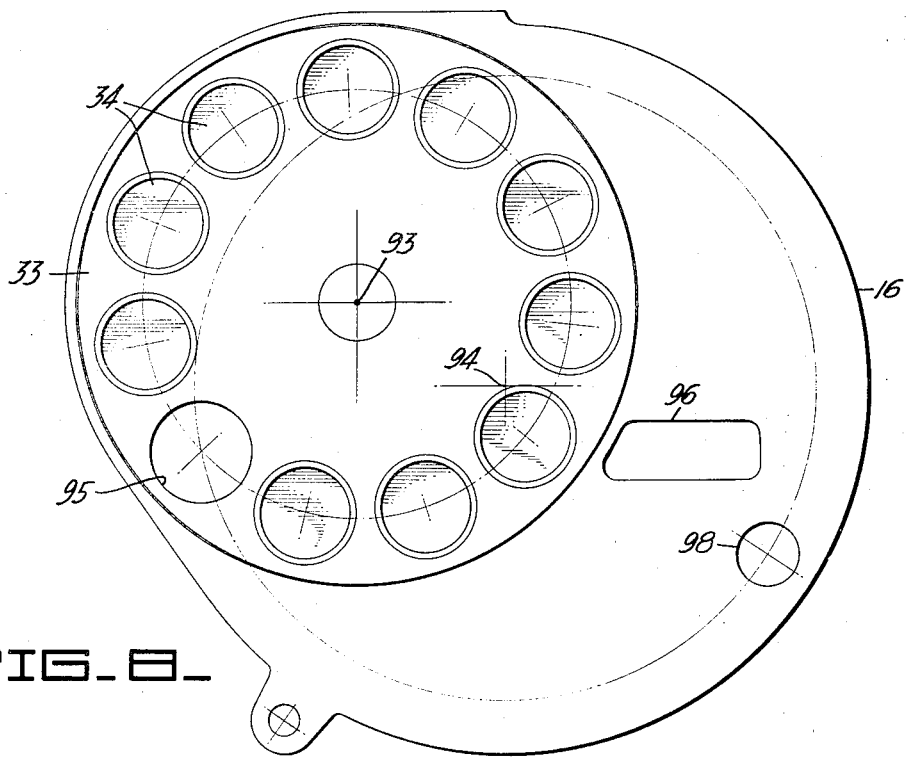
FIG_8_
FIG_9_
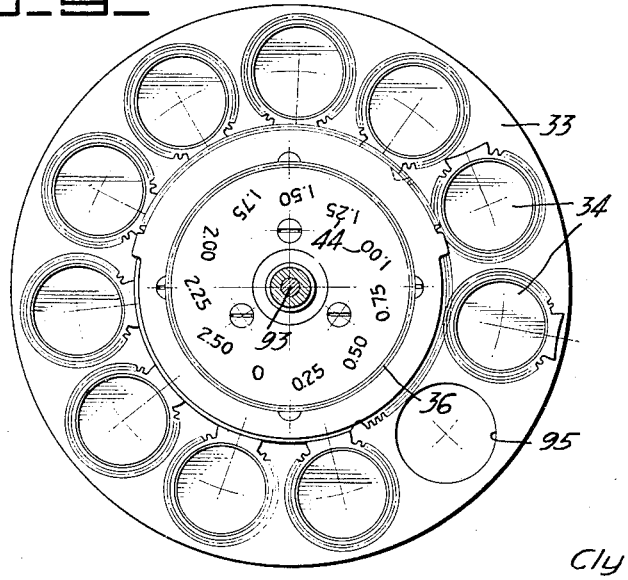
INVENTOR.
Clyde L. Hunsicker
BY
White, Prost, Fehr & Lothrop
ATTORNEYS.

Feb. 6, 1934.  C. L. HUNSICKER  1,945,940
OPHTHALMOLOGICAL INSTRUMENT
Filed Jan. 4, 1932  8 Sheets-Sheet 5
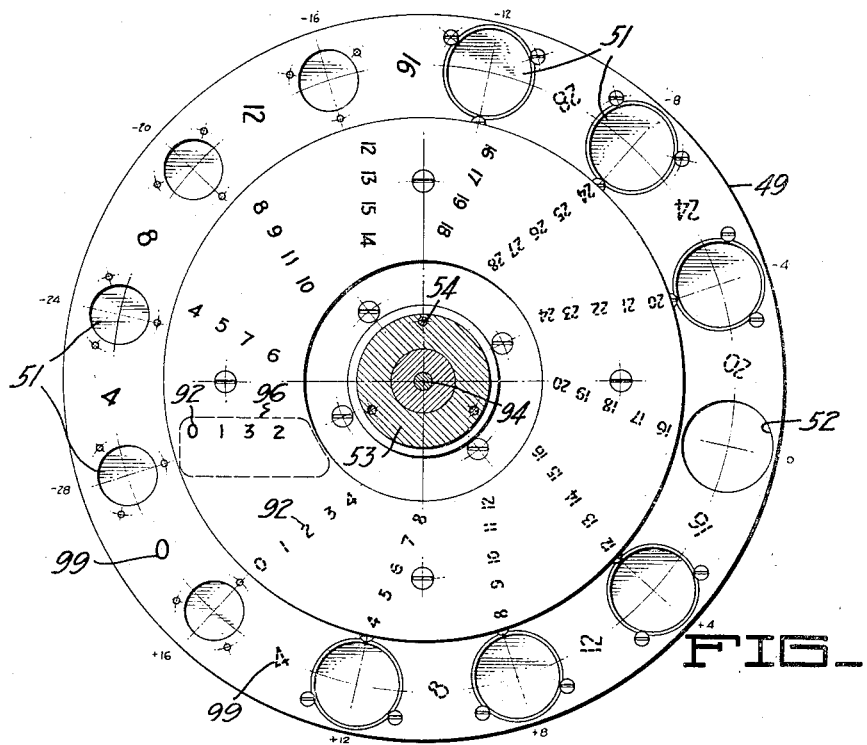
FIG_11_
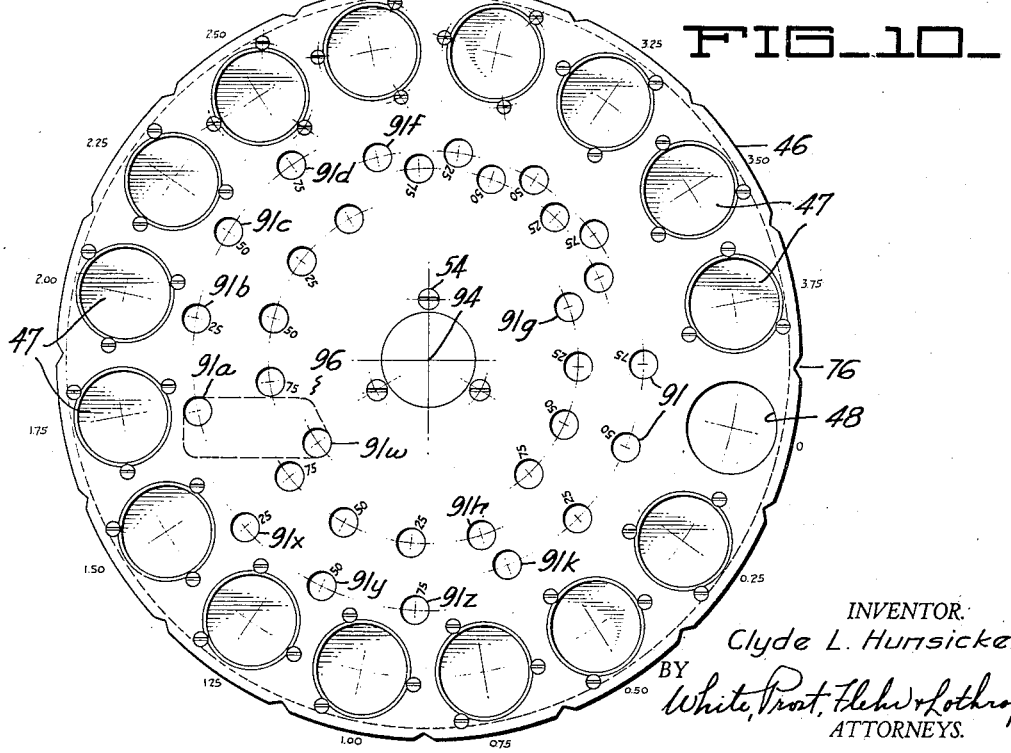
FIG_10_
INVENTOR.
Clyde L. Hunsicker
BY
White, Prost, Fehr & Lothrop
ATTORNEYS.

Feb. 6, 1934. C. L. HUNSICKER 1,945,940
OPHTHALMOLOGICAL INSTRUMENT
Filed Jan. 4, 1932 8 Sheets-Sheet 6
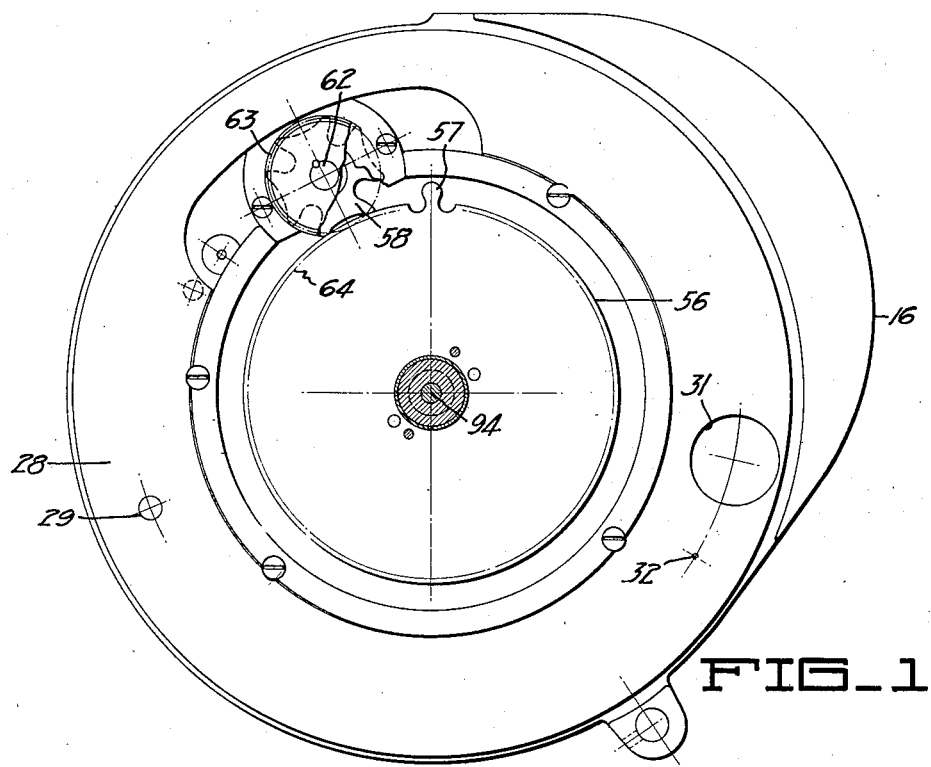
FIG_13_
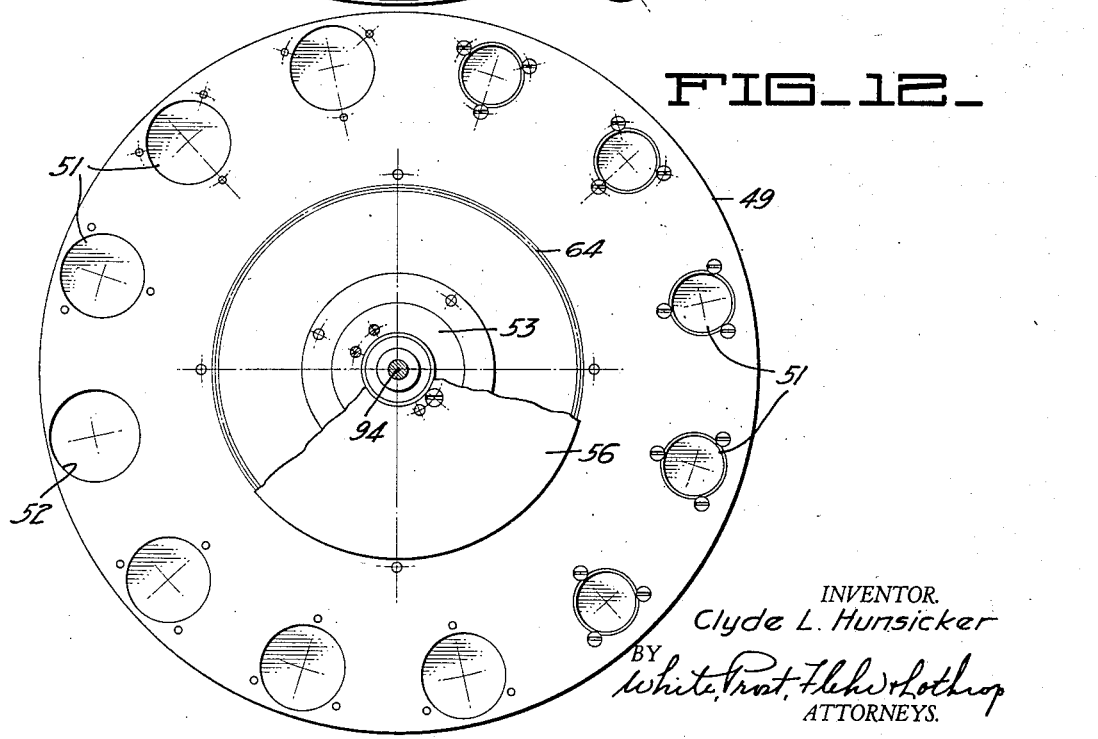
FIG_12_
INVENTOR.
Clyde L. Hunsicker
BY
ATTORNEYS.

Feb. 6, 1934.  C. L. HUNSICKER  1,945,940
OPHTHALMOLOGICAL INSTRUMENT
Filed Jan. 4, 1932  8 Sheets-Sheet 7
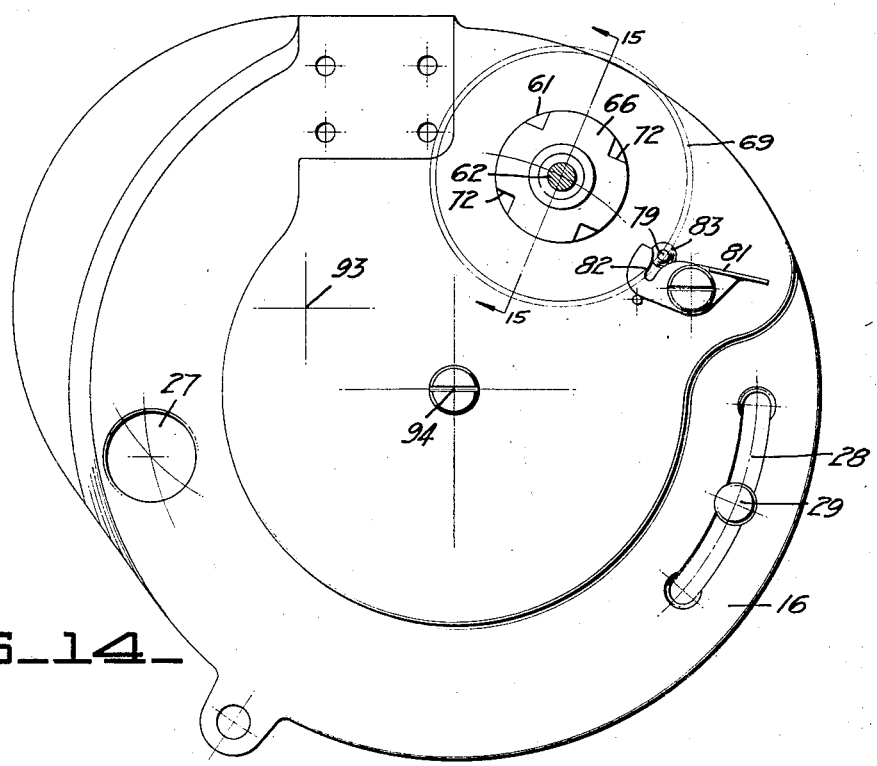
FIG_14_
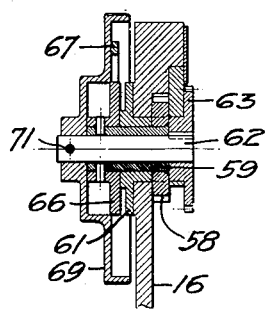
FIG_15_
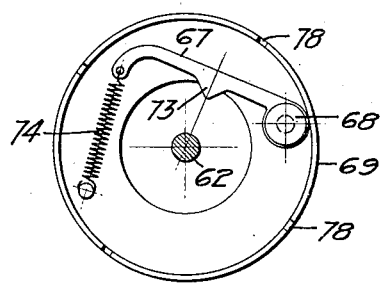
FIG_16_
INVENTOR.
Clyde L. Hunsicker
BY White, Prost, Flehr & Lothrop
ATTORNEYS.

Feb. 6, 1934. C. L. HUNSICKER 1,945,940
OPHTHALMOLOGICAL INSTRUMENT
Filed Jan. 4, 1932 8 Sheets-Sheet 8
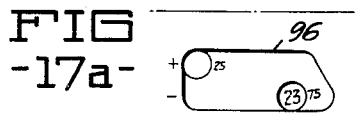
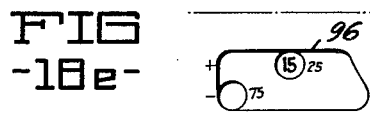
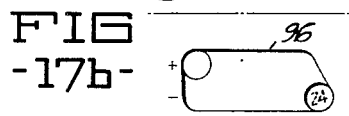
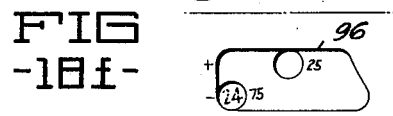
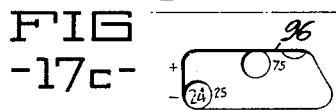
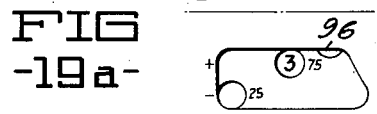
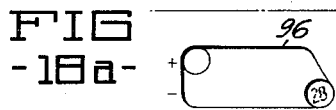
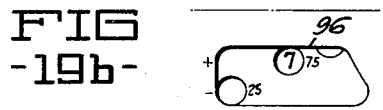
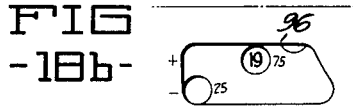
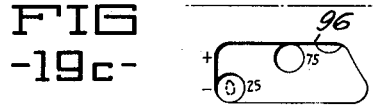
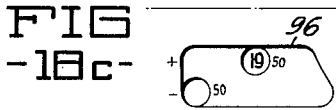
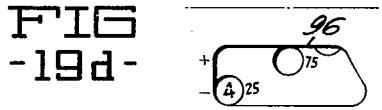
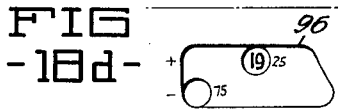
INVENTOR.
Clyde L. Hunsicker
BY
White, Prost, Flehr & Lothrop
ATTORNEYS.

Patented Feb. 6, 1934

1,945,940

UNITED STATES PATENT OFFICE 1,945,940

OPHTHALMOLOGICAL INSTRUMENT

Clyde L. Hunsicker, San Francisco, Calif., assignor of one-half to Aaron S. Green and Louis D. Green, both of San Francisco, Calif.

Application January 4, 1932. Serial No. 584,592

9 Claims. (Cl. 88—22)

My invention relates to ophthalmological instruments of the type known as optometers, which are used primarily by oculists for determining lens prescriptions for defective eyesight. It relates more particularly to that class of optometers in which a plurality of lenses are movably mounted within a casing, these lenses being adapted to be adjusted in different combinations to obtain different refractive powers.

Two systems of lenses can be employed in the optometer, one system containing cylindrical lenses and the other system containing spherical lenses. In my Patent No. 1,804,691, granted May 12, 1931, an optometer is disclosed in which the spherical system of lenses comprises a group of major lenses and a group of minor lenses and means is provided for successively superimposing any one of the lenses of one group on any one of the lenses in the other group, whereby the refractive power can be increased gradually from a minimum to a maximum, the minimum value being the most negative refractive power and the maximum value being the most positive refractive power attainable with the lenses provided. The range of refractive powers is sufficiently great and the increment between successive powers is sufficiently small to cover practically all cases of defective eyesight encountered in ordinary practice without superimposing more than two spherical lenses. For those extremely rare cases which require a correction outside of the range thus provided, a third lens can be superimposed on any one of the combinations afforded by the system to extend the range accordingly. In the patent referred to, a series of numbers associated with the group of minor lenses indicates the value of the minor lens and another series of numbers associated with the major lenses indicates the value of the major lens entering into the adjusted combination and by calculation, the refractive power of the combination can be determined.

It is one object of the present invention to provide means in a device of the character described, for indicating automatically the calculated value of one of the optical characteristics of any of the possible combinations of superposed lenses, thereby eliminating possible errors which might occur when the calculations are made mentally. For example, when the principles of the invention are applied to a spherical lens system such as that disclosed in my prior patent above referred to, the refractive power of each combination of lenses can be automatically indicated in diopters, rather than indicating separately the respective refractive powers of each of the individual lenses entering into the combination.

It is another object of my invention to provide quick clearing means in a device of the character described, in conjunction with automatic calculating means, whereby the major lenses can be superposed in succession on any one of the minor lenses without moving the minor lens chosen and without jeopardizing the accuracy of the automatic calculating means.

Still another object is to provide automatic calculating means of the character described which is applicable to lens systems including both positive and negative lenses.

Still another object is to provide automatic calculating means of the character described, which is dependent only upon the relative positions of the lens carrying members without resorting to the interposition of any other mechanism, thereby rendering the calculating means practically infallible.

Still another object is to provide means for supporting a cylindrical lens system in the same housing with a spherical lens system and in cooperative relationship therewith, in conjunction with automatic calculating means of the foregoing character associated with the spherical lens system, in such a manner that the cylindrical lens system does not interfere with the reading as determined by the calculating means.

Still another object is to provide means of the above mentioned character which is simple in construction and economical in manufacture.

These and other objects and advantages are attained in the embodiment of my invention illustrated in the accompanying drawings, in which:

Fig. 1 is an elevational view of an optometer embodying the features of the invention.

Fig. 2 is a side elevational view of a certain ciliary-dynemometer adapted to be assembled in operative relationship with the optometer shown in Fig. 1.

Fig. 3 is a cross sectional view taken along the planes indicated by the dot and dash lines 3—3 of Fig. 1 and of Fig. 6.

Fig. 4 is a view showing in detail a novel mounting for a Stevens phorometer which is adapted to be used in conjunction with the optometer.

Fig. 5 is a view showing in detail the mounting of certain other special lenses.

Fig. 6 is an elevational view on an enlarged scale of one-half of the optometer, the other half being substantially symmetrical.

Fig. 7 is a cross sectional view taken along the plane indicated by the line 7—7 of Fig. 3 with the cylindrical lens carring disc removed.

Fig. 8 is a cross sectional view taken along the same plane as Fig. 7 with the cylindrical lens carrying disc in position.

Fig. 9 is a view of the under side of the cylindrical lens carrying disc as viewed in Fig. 3.

Fig. 10 is a view of one side of the minor spherical lens carrying disc looking in the direction of the arrows 10—10 of Fig. 3.

Fig. 11 is a view of one side of the major spherical lens carrying disc looking in the direction of the arrows 11—11 of Fig. 3.

Fig. 12 is a view of the obverse side of the major spherical lens carrying disc looking in the direction of the arrows 12—12 of Fig. 3.

Fig. 13 is a view of the under side of the rear plate of the lens housing as viewed in Fig. 3 and looking in the direction of the arrows 13—13 of this figure, part of the structure being broken away to show certain intermittent gearing employed between the major and minor spherical lens carrying discs.

Fig. 14 is an elevational view of the rear plate of the lens housing.

Fig. 15 is a cross sectional view illustrating in detail the intermittent motion transmitting mechanism interposed between the minor and major spherical lens carrying discs.

Fig. 16 is a detail of the actuating knob of the drive mechanism shown in Fig. 15.

Figs. 17a to 17c, 18a to 18f, and 19a to 19d illustrate several readings as they are indicated by the calculating means of the instrument.

In its preferred form, the ophthalmological instrument of this invention comprises a spherical lens system and a cylindrical lens system mounted in a housing common to both. The cylindrical lens system comprises a series of cylindrical lenses having different optical characteristics and means is provided for moving any one of the cylindrical lenses into registration with a sight opening. Means can also be provided for rotating the particular cylindrical lens which is in registration about its own center.

The spherical lens system comprises a member carrying a series of major lenses of positive and negative refractive powers, these lenses being graded in strength uniformly from the most negative lens to the most positive lens, the increment between lenses of successive strength values being four diopters in the embodiment illustrated. A member carrying a series of minor spherical lenses is also included in the spherical lens system, these minor lenses being graded in strength from zero to 3.75 diopeters in increments of .25 diopters in the embodiment chosen for illustration. Means is provided for superposing any one of the major lenses on any one of the minor lenses in registry with the sight opening. Each series of spherical lenses is preferably mounted on a rotatable disc and intermittent drive mechanism interposed between the spherical lens carrying discs serves to move the major lens carrying disc one step after each complete revolution of the minor lens carrying disc, whereby the entire range of combinations attainable can be placed in successive registry in the sight opening from the most negative combination to the most positive combination in steps of .25 diopters throughout the entire range. Preferably, the intermittent drive mechanism includes clutch mechanism and means is provided for moving the major lenses into successive registry with the sight opening without the necessity of moving the minor lenses. This feature enables quick clearing, since any desired refractive strength can be approached in steps of 4 diopters rather than in steps of .25 diopters. When the approximate refractive power desired is obtained, finer adjustments can be made in steps of .25 diopters by moving the minor lens carrying disc.

Calculating means is provided for indicating calculated value of an optical characteristic of the combination of lenses in the sight opening. In the embodiment illustrated the calculating means comprises a plurality of apertures in the minor lens carrying disc which are adapted to reveal certain numerals on the major lens carrying disc. An opening in the housing for the lenses permits readings to be taken. The numerals on the major lens carrying disc are so disposed that only those numerals which will enter into the indication of the calculated value for a particular setting of the major lens carrying disc will occur within the opening in the lens housing. The apertures in the minor lens carrying disc select a particular one of the numerals on the major lens carrying disc in accordance with the setting of the minor lens carrying disc relative to the major lens carrying disc. In the embodiment of the invention illustrated, the integers of the calculated value are disposed on the major lens carrying member and are visible through the apertures in the minor lens carrying member. The decimals or fractions are mounted on the minor lens carrying member adjacent the apertures therein. For any particular setting of the spherical lens system, the calculated value of the refractive power in diopters of the combination of lenses in registry with the sight opening is indicated by the numbers on both discs registering in the reading opening in the casing.

Referring now to the drawings, and first to Fig. 1, in which a complete instrument is illustrated, a pair of lens supporting housings 16 and 17 are shown which are adjustably mounted on a support 18. The housings 16 and 17 support a plurality of lenses and are substantially identical or symmetrical in construction throughout, the lenses in one housing being used to test the left eye of the patient and the lenses in the other being used to test the right eye. A pair of level indicating devices 19 and 21 can be provided and a plurality of level adjusting screws, one of which is shown at 22, can be employed for leveling the instrument in two directions at right angles to each other. The lens housings 16 and 17 are carried by arms 23 and 24, respectively, and an actuating knob 26 serves to actuate a rack and pinion mechanism (not shown) for adjusting the separation between the lens housings. A rack and pinion mechanism suitable for this purpose is shown and described in my Patent No. 1,804,691, above referred to. By turning the knob 26 in one direction or the other, the correct setting for the pupillary distance of the patient's eyes can be obtained.

In Fig. 6 a view of one of the lens housings is shown on an enlarged scale. A sight opening 27 is provided into which the different lenses in the housings are adapted to be brought into registry. A shutter 28 (Fig. 13) actuated by a knob (Fig. 14) is movable to three distinct positions, in one of which the sight opening is closed. In another position of the shutter, a relatively large aperture 31 is brought into registry with the sight opening, thereby clearing the passage. In the third position of the shutter 28, a pin hole 32 is brought into registry which can be used for initially setting the apparatus to accommodate the pupillary distance between the patient's eyes.

The cylindrical lens system can be similar to that shown and described in my Patent No. 1,804,691, and this patent is referred to for a detailed description of this part of the instrument. Briefly, however, the cylindrical lens system comprises a lens carrying disc 33 which supports a plurality of cylindrical lenses 34 of different powers, spaced circumferentially around the periphery of the disc. A gear 36 (Fig. 3) secured concentrically to the disc 33 meshes with a pinion 37 secured to the shaft of an actuating knob 38. By rotating the knob 38, the disc 33 is turned to bring the various lenses thereon into successive registry in the sight opening. A rotatable knob 39 serves to rotate the lens in registry with the sight opening about its own axis without rotating all of the other lenses, as disclosed in the above mentioned patent, and an indicating scale 41 cooperating with a pointer arm 42 provides an indication of the angular setting of the particular cylindrical lens which is in registry. For indicating the power of the cylindrical lens in registry with the sight opening, an aperture 43 is provided in the housing through which numerals 44 on the gear 36 of the cylindrical lens carrying disc are visible. The numerals are so arranged that when any particular cylindrical lens is positioned in the sight opening, the numeral corresponding to the refractive power of that lens is in registration with the aperture 43.

The spherical lens system comprises a rotatable disc 46 on which is mounted a series of graded spherical lenses 47 of successively increasing refractive powers. The lenses 47 are uniformly spaced circumferentially about the disc 46 and in the embodiment illustrated, there are fifteen of these lenses varying in power from .25 diopters to 3.75 diopters, the increment between the lenses of successive powers being .25 diopters. An aperture 48 is included in the series and this aperture represents a lens of zero power. The lenses 47 are herein referred to as being "minor lenses." By turning the minor lens carrying disc 46 in a counterclockwise direction, as viewed in Fig. 10, the minor lenses are brought one at a time into registry with the sight opening in a regular sequence, each lens surpassing in power by .25 diopters the lens which it replaces, until the lens of 3.75 diopters is reached, after which the cycle is repeated.

A second lens carrying disc 49 on which is mounted a series of coarsely graded spherical lenses 51 is also included in the spherical lens system. The disc 49 is mounted for rotation about an axis which is concentric with the axis of rotation of disc 46. The lenses on disc 49 are shown as being eleven in number in the embodiment illustrated, and vary in power from minus 28 diopters to plus 16 diopters, the increment between lenses of successive powers being 4 diopters. These lenses will be referred to herein as being "major lenses" to distinguish from the minor lenses on disc 46. An aperture 52 in the major lens carrying disc 49 represents a lens of zero refractive power and this aperture is located in the sequence of major lenses between the lens of plus 4 diopters and the lens of minus 4 diopters.

Intermittent drive mechanism is provided for interconecting the minor lens carrying disc and the major lens carrying disc, whereby for each complete revolution of the minor lens carrying disc 46 the major lens carrying disc is moved a distance sufficient to bring the next higher or next lower major lens into registry with the sight opening, in accordance with the direction of rotation of the minor lens carrying disc. Thus, the minor lens carrying disc 46 is secured to a hub 53, as by means of screws 54, and mounted concentrically upon the hub 53 is a circular plate 56 having a single projecting tooth 57 extending from its periphery. The tooth 57 cooperates with a Geneva gear 58 and for each revolution of the minor lens carrying disc 46 and the plate 56, the tooth 57 serves to turn the Geneva gear 58 one step or one-quarter of a revolution.

As shown most clearly in Fig. 15, the Geneva gear 58 is rigidly secured to a sleeve 59 journalled in a bushing 61 carried by one wall of the lens housing 16. A shaft 62 rotatably disposed within the sleeve 59 carries a pinion 63. The pinion 63 meshes with a gear 64 (Fig. 12) which is fastened concentrically to the major lens carrying disc 49. For transmitting the motion of the Geneva gear 58 to the pinion 63, clutch mechanism is provided, and in the embodiment illustrated, I have shown the clutch as comprising a notched disc 66 pinned to the sleeve 59 to turn with the Geneva gear 58. Cooperating with the notched disc 66 is a spring biased detent lever 67 which is mounted to turn with the pinion 63. The detent lever 67 is pivoted, as at 68, to an actuating knob 69 which is pinned, as at 71, to the shaft 62 of the pinion 63. The disc 66 has a series of notches 72 cut in its periphery, corresponding in number to the number of teeth on the Geneva gear 58, the number being four in the present instance. A projection 73 on the lever 67 is adapted to enter the notches 72 in the disc 66 and the force exerted by the biasing spring 74 on the lever 67 is in such a direction that the projection 73 is resiliently held against the adjacent surface of the disc 66. When the projection 73 is adjacent one of the notches 72, it is caused to enter the notch under the influence of the spring 74. The friction between the projection 73 and the engaged notch 72 is amply sufficient normally to transmit the motion of the Geneva gear 58 to the pinion 63 and to drive the major lens carrying disc 49 without slipping of the clutch element. The gear ratio between the pinion 63 and the gear 64 with which it meshes, is such that the major lens carrying disc 49 is turned an angular amount sufficient to bring the next successive lens to registry with the sight opening when the motion of the Geneva gear 58 in turning one-quarter of a revolution is transmitted to the pinion 63.

The minor lens carrying disc 46 projects slightly beyond the lens housing throughout a substantial portion of the periphery, as shown in Fig. 1, and to turn the minor lens carrying disc to bring successive lenses thereon into registry with the sight opening, the edge of the disc is knurled and can be grasped by the operator and the disc given the desired amount of angular movement. A series of notches 76 are formed in the periphery of the minor lens carrying disc 46 and a plunger detent 77 registers with one of the notches whenever one of the minor lenses is aligned in the sight opening. The disc 56 having the tooth 57 thereon turns with the minor lens carrying disc 46 and the uninterrupted portion of the disc 56 slides past the Geneva gear 58 until the last lens in the series of minor lenses is brought into registry. Upon turning the minor lens carrying disc 46 to replace the lens of zero power with the lens of 3.75 diopters or vice versa, however, the tooth 57 is carried into engagement with the Geneva gear 58, thereby moving it one step or one-quarter of a revolution. The motion of the Geneva gear 58 is transmitted to the sleeve 59 to the notched disc 66, thence to the detent 67 and knob 69, to the shaft 62 and pinion 63 to the gear 64, thereby causing the gear 64 to be turned by an amount sufficient to bring the next successive major lens on the disc 49 into registry with the sight opening. All of the minor lenses can then be superposed on the new major lens which thus is brought into registry and at the end of the series of minor lenses the next major lens will be automatically moved up and so on until every one of the major lenses has had superposed thereon the entire series of minor lenses. The cycle will be repeated upon continued rotation of the minor lens carrying disc in its original direction of rotation.

The lenses on the two discs are preferably so arranged that when the minor lens carrying disc is turned in the direction which causes minor lenses to increase in power, the movement imparted to the major lens carrying disc causes major lenses of increased power to replace those of lesser power. When the minor lens carrying disc is turned in the opposite direction, however, so that weaker minor lenses replace the stronger, the motion imparted to the major lens carrying disc is such that weaker major lenses replace the stronger major lenses.

The major lens carrying disc 49 can be turned, however, without rotating the minor lens carrying disc 46, by turning the knob 69. When the knob 69 is rotated, corresponding rotation is imparted to the pinion 63 and gear 64 of the major lens carrying disc 49 by means of the shaft 62 on which the knob 69 and the pinion 63 are both fixed. During this movement, the detent lever 67 is carried around with the knob 69 but the projection 73 rides over the notches 72 and slips over the peripheral surface of the disc 66 without turning the disc. The Geneva gear 58 is locked against the rotational movement by the adjacent bearing surface of the disc 56, thereby holding the sleeve 59 and the notched disc 66 stationary during the turning motion of the knob 69. Thus, irrespective of the position in which the minor lens carrying disc may be adjusted, the major lens carrying disc can be moved to bring all of the major lenses into successive alignment with the particular minor lens which may be in registry with the sight opening.

Means is preferably provided for locking the major lens carrying disc in any one of the adjusted positions, so that the entire series of minor lenses can then be repeatedly superposed on any one of the major lenses. Thus, I have shown the knob 69 as having a series of four notches 78 formed in the edge thereof which are adapted to be engaged by a spring pressed plunger detent 79. The detent 79 is biased in such a direction that it tends to enter one of the notches 78 when the major lens carrying disc 49 is in any position which brings one of the major lenses in registry with the sight opening. A manually operable lever 81 having a notch or groove 83 therein which acts as a cam surface against a conical shoulder 83 on the detent 79, serves to hold the detent in a non-interfering position for one position of the lever 81 and in the other position of the lever, such as that shown in Fig. 14, the detent 79 is permitted to enter one of the notches 78 and hold the knob 69 locked against movement. When the knob 69 is thus held against the rotation, movement of the Geneva gear 58 by the minor lens carrying disc 46 is not transmitted to the major lens carrying disc 49, because of the locked condition of the knob 69 and the pinion 63. Instead, the notched disc 66 rides under the projection 73 of the detent 67 and only the minor lens carrying disc is turned, while the major lens carrying disc remains stationary. Preferably, the notches 72 in disc 66 are so disposed relative to the projection 73 on lever 67 that the projection engages a notch whenever one of the major lenses is in registry with the sight opening, so that in addition to affording the desired friction in the clutch mechanism, these parts also serve to indicate to the operator when the major lens adjacent the sight opening is in exact alignment therewith, the operator being made aware of this condition by hearing and feeling the projection 73 snap into the cooperating notches.

From the description of the spherical lens system thus far, it will be noticed that the major lens carrying disc and the minor lens carrying disc can each be moved independently of the other, or that the major lens carrying disc can be moved step by step in response to continued rotation of the minor lens carrying disc. For example, when the lever 81 is actuated to release the knob 69, turning movement of the minor lens carrying disc will cause the major lens carrying disc to move one step to the next major lens each time the last lens of the minor series is passed through the registering position in either direction. By turning the knob 69 in either direction, any one of the major lenses can be superposed in succession upon the minor lens which happens to be in registry. When the lever 81 is positioned so that the detent 79 locks the major lens carrying disc, the minor lens carrying disc can be moved in either direction to any desired extent without changing the particular major lens which happens to be in registry. The flexibility of the motion transmitting mechanism also enables both of the lens carrying discs 46 and 49 to be rotated simultaneously either in the same direction or in opposite directions, and without any definite relationship between the movement of the two discs. For example, the knob 69 can be turned in either direction to change the major lenses, while the operator is also moving the minor lens carrying disc 46 with his other hand. This flexibility of movement and particularly the feature which enables the major lens to be changed without moving the minor lenses affords quick clearing of the instrument, that is, a particular setting of lenses can be changed to any other setting without resorting to the tedious process of passing through all of the possible adjustments which lie intermediate the two settings. In the embodiment illustrated, any particular setting can be changed to any other possible setting by rotating each of the lens carrying discs less than one complete revolution, thereby reducing the time and labor involved in this operation to a minimum. However, by rotating the minor lens carrying disc through a sufficient number of revolutions to bring all of the major lenses into registry one at a time, every one of the possible adjustments in the entire range can be obtained in regular sequence.

I desire to provide the instrument with means for indicating the calculated value of the refractive power of any combination of spherical lenses which happens to be in registry in the sight opening at any instant and because of the quick clearing feature, this calculating means is preferably entirely independent of the driving mechanism interposed between the lens carrying discs, so that the acuracy of the indicating means will not be affected when one disc is held stationary while the other is rotated through one or more complete revolutions.

For accomplishing this object, the minor lens carrying disc 46 is provided with a plurality of apertures 91 and the major lens carrying disc 49 has marked thereon in any suitable manner a plurality of numerals 92 which are adapted to register with the apertures 91 in the minor lens carrying disc in accordance with the relative setting of the discs. The apertures 91 in the minor lens carrying disc are arranged in definite groups, the number of apertures in each group being four in the embodiment illustrated. One of these groups is indicated by the reference characters 91a to 91d and the other apertures are arranged in corresponding groups with the exception of one group which, in Fig. 10, has been indicated by the reference characters 91w, 91x, 91y and 91z. It will be noticed that the apertures in the group 91a to 91d are all equidistant from the axis about which the disc 46 is rotatable, and that the same relation exists between apertures in the other groups with the exception of the group 91w to 91z. In the group 91w to 91z, the apertures 91x, 91y and 91z are all substantially equidistant from the axis of disc 46, but the aperture 91w is considerably closer to the axis for a reason which will be explained more fully hereinafter.

In the assembled instrument the minor lens carrying disc 46 (Fig. 10) is superposed on the major lens carrying disc 49 (Fig. 11) so that only those numerals 92 on disc 49 which register in certain apertures on the disc 46 will be visible to the operator. One side of the housing 16 conceals all of the apertures 91 in disc 46 with the exception of those apertures which fall within a reading opening 96 (Fig. 6) provided in the housing. Within the reading opening 96 the calculated value is given of one of the optical characteristics of the combination of spherical lenses which happens to be in registry with the sight opening at any given instant. In the embodiment illustrated, the refractive power of the combination of lenses is indicated in diopters and the numerals marked on the respective discs 46 and 49 are properly selected to give this indication.

Referring now to Figs. 10 and 11 and assuming that the disc 46 has been transposed so that it lies directly over the disc 49 and assuming also that the housing 16 is disposed over the discs, the reading opening 96 in the housing will be in the position shown in dotted lines in Figs. 10 and 11. Under these conditions only the apertures 91a and 91w will be visible in the reading opening 96 and the numeral "0" of the full line numerals on disc 49 will be visible through the aperture 91a. As will be seen from Fig. 11, none of the numerals on disc 49 will register with the aperture 91w at this time. The indication as it appears to the operator under these conditions is illustrated in Fig. 6. At this setting of the optometer, the aperture 43 in the minor series of lenses and the aperture 52 in the major series of lenses are superposed in the line of sight afforded by the sight opening 27 (Fig. 6). The refractive power of the combination of lenses, therefore, is zero and this is the reading which is indicated in the reading opening 96.

The reading opening 96 can bear a suitable legend, such as "Sph. totals", as shown in Fig. 6, and a plus sign (+) can be marked on the housing near the upper edge of the reading opening and a minus sign (—) can be marked near the lower edge. In this connection it may be explained that the positive readings are given in the upper portion of the reading opening and the negative readings are given in the lower portion, in the embodiment illustrated. It is to be understood that this relationship between the positive and negative readings is for the purpose of rendering the indications easier to read and that any other desired relationship between the positive and negative readings can be made by slightly shifting the position of the apertures 91 and by making the corresponding alterations in the positions of the numerals 92. If desired, the positive readings can have a color which is distinct from the color of the negative readings and in this manner the algebraic sign of any of the readings can be distinguished by the color thereof. In Fig. 11, I have shown those numerals 92 which enter into the positive readings in full lines and those numerals which enter into the negative readings in broken or dotted lines to represent the color scheme.

On the minor lens carrying disc 46 each group of apertures has certain numerals marked adjacent definite ones of the apertures in the group, for example, adjacent the aperture 91b the numeral "25" is marked and adjacent the aperture 91c and 91d the numerals "50" and "75", respectively, are marked. Thus, the numerals associated with the groups 91a to 91d increase progressively from "0" to "75" in increments of 25 as they are read in a clockwise direction in Fig. 10. The aperture 91f starts a new group of four apertures in which the associated numerals also increase progressively in a clockwise direction.

Two other groups of similarly marked apertures follow in succession in traveling clockwise about the disc 46. These four groups of apertures and their associated numerals enter into positive indications and for any registering position of the lenses on the minor lens carrying disc 46 one of the apertures, and only one, in these four groups will be positioned in the upper part of the reading opening 96.

The remaining apertures on disc 46 enter into the negative readings and these apertures can be divided likewise into four groups of four each. As heretofore mentioned, the group 91w, 91x, 91y and 91z has one aperture, namely, 91w, which is closer to the axis of disc 46 than the other apertures of the group, but aside from this all of the associated apertures in each one of the negative groups are equidistant from the axis of the disc 46. The numerals associated with each group of the negative apertures increase progressively as they are read in a counterclockwise direction in Fig. 10. While it has not been indicated in Fig. 10, the numerals on the minor disc entering into negative readings can be given a different color from the numerals entering the positive readings to correspond with the coloring of the numerals 92 on the major lens carrying disc. For every setting of the minor lens carrying disc which brings one of the lenses into registry with the sight opening, one of the negative apertures, and only one, will be positioned in the lower portion of the reading opening 96.

Thus, for every setting of the minor lens carrying disc which brings one of the minor lenses into registry, there will be two apertures in the reading opening, one being in the upper portion of the aperture entering into positive reading and the other being in the lower portion and entering into negative reading. Only one of the apertures will be effective at any one time, however, since the numerals 92 on the major lens carrying disc 49 are so disposed that only one of the numerals 92 will be revealed through one of the apertures 91 in the reading opening at any particular setting of the major lens carrying disc which brings a major lens into registry with the line of sight. The numerals 92 on the major lens carrying disc 49 represent the integers of the indicated readings and the numerals adjacent the apertures on the minor lens carrying disc 46 represent the decimals of the indicated reading. The calculated value of any setting, therefore, is obtained by reading the numbers on both discs together as a single number. For example, when the numeral "7" is visible through one of the apertures in the minor lens carrying disc and when the numeral "75" is associated with that aperture, as in Fig. 19b, the indicated reading is 7.75 and the lenses in registry with the sight opening have a combined refractive power of 7.75 diopters. Accordingly, the numerals 92 are so arranged on the major lens carrying disc that whenever one of the major lenses is in registry with the sight opening, the particular numerals 92 which are brought into the area defined by the reading opening 96 constitute all of the possible integers which will be found in the calculated value of any combination of lenses which includes that major lens. For example, when the major lens carrying disc 49 is in the position in which the "0" major lens is in registry with the sight opening, the numerals "0", "1", "3" and "2" are disposed within the area defined by the reading opening 96. Since the minor lenses are graded from zero to 3.75 diopters, the calculated value obtained by combining the zero major lens with any of the minor lenses will lie between 0 and 3.75 diopters. For the same reason when the major lens of plus 4 diopters is in registry, the calculated value of any combination including this lens will lie between 4 and 7.75 diopters. Accordingly, the numerals "4", "5", "7" and "6" are positioned on the major lens carrying disc in such a manner that they are brought into the area defined by the reading opening 96 when the major lens of plus 4 diopters is in registry. The position of the numerals 92 associated with each lens of positive refractive power is preferably such that they lie in the upper portion of the reading opening 96, when the associated major lens is moved into registry in the sight opening.

When a negative major lens is brought into registry with the sight opening, only negative integers are moved into the area defined by the reading opening 96 and preferably only those negative integers which will enter into the calculated value of the combinations which include that major lens and any one of minor lenses. For example, when the major lens of minus 4 diopters is moved into registry with the line of sight, the numerals "0", "1", "2", "3" and "4" of the negative integers are moved into the area defined by the reading opening 96. In order that these numerals will cooperate with the apertures 91 which register with the lower portion of the reading opening 96, these numerals are so positioned that they likewise register in the lower portion of the reading opening. It will be noticed that the negative numerals 92 on the major lens carrying disc (those shown in broken or dotted lines) are arranged in rows of five each, whereas the positive numerals are arranged in rows of four. The reason for this is that when one of the negative major lenses is combined with the various minor lenses provided in the embodiment illustrated, the calculated value of the possible combinations extends through a range of five integers, while for positive lenses a range of four integers is sufficient for all of the possible combinations. For example, when the major lens of minus 4 diopters is in registry, the possible combinations attainable, by superposing thereon the minor lenses provided, will have a refractive power lying between minus 0.25 and minus 4 diopters. In other words, when the minor lens of plus 3.75 diopters is superposed on the major lens of minus 4 diopters, the calculated value or the algebraic sum of the powers of the two lenses is minus 0.25 diopters and when the minor lens of 0 diopters is superposed on the major lens of minus 4 diopters the calculated value is minus 4 diopters. Superposing intermediate minor lenses on the major lens of minus 4 diopters will, of course, give combinations of intermediate refractive power. To provide indications for all of the possible negative combinations, therefore, a range of five integers must be allotted to the lens of minus 4 diopters and for each of the other negative major lenses illustrated. When the negative major lens of minus 4 diopters is in registry, the calculated values of the combinations attainable will include three values having the integer "0"; four values each including the integers "1", "2" and "3" and one value which includes the integer "4". Stated generally, each negative major lens forms combinations with the minor lenses such that the refractive power of any possible combination can be expressed by one of five consecutive integers, the smallest integer entering into three of the combinations and the largest integer entering into only one of the combinations, while the intermediate integers enter into four combinations each.

From the foregoing explanation, it is believed that the reason for positioning apertures 91w, 91x, 91y and 91z in the manner shown in Fig. 10 will be understood. The aperture 91w is positioned to reveal the highest integer in each of the rows of negative numerals. Since this integer can enter into only one combination of lenses for any particular setting of the major lens carrying disc irrespective of how the minor lens carrying disc may be moved, this integer should be revealed only once by the minor lens carrying disc. For this reason, the aperture 91w is segregated and is the only aperture which will reveal the innermost numeral in the negative rows of numerals.

The apertures 91x, 91y and 91z are so disposed that they will reveal the lowest integer in each of the rows of negative numerals. From an inspection of Fig. 11 it will be seen that the lowest integer is the outermost one in each of the rows and that the apertures 91x, 91y and 91z are equally remote from the axis of rotation of the lens carrying discs. The three apertures 91x, 91y and 91z each reveals the lowest integer in the negative row of numerals which happens to be in registry with the reading opening 96, thus giving the calculated value of the three possible combinations into which this integer can enter. The intermediate negative integers are each revealed four times by the three groups of four apertures which are placed to cooperate with the intermediate negative integers.

The operation of the calculating means can best be explained by specific examples. Assuming that the disc 46 is superposed on the disc 49 in operative relationship within the housing 16, the reading "0" will be indicated, as is shown in Fig. 6, when the zero lenses 48 and 52 are superposed. Now, while the major lens carrying disc 49 is held stationary, let us suppose the minor lens carrying disc is moved counterclockwise to superpose the minor lens of 0.25 diopters on the zero major lens. By this movement, the aperture 91a (Fig. 10) will be moved away from the reading opening 96 and the aperture 91b will be moved into the reading opening instead. The aperture 91b has marked adjacent it the number "25" so that the indicated reading will now be 0.25. This is the calculated value of the refractive power of superposed lenses and is equivalent to the algebraic sum of the major lens of zero power and the minor lens of 0.25 diopters. Moving the minor lens still further in a counterclockwise direction, 0.50 diopters will be indicated and then 0.75 diopters, as the minor lenses of 0.50 diopters and 0.75 diopters are brought into registry with the sight opening. Moving the minor lens carrying disc one step further, the aperture 91f will be brought into the reading opening, but this aperture will not reveal the numeral "0" but will reveal the numeral "1", thus indicating that the combination of lenses in registry have a combined refractive power equivalent to 1.0 diopters. Following the same procedure further, the indications "1.25", "1.50" and "1.75" will be given in succession and then the minor lens of 2 diopters will be superposed on the zero major lens. At this time, the aperture 91g will reveal the numeral "2", and the other apertures in this group will give the indications "2.25", "2.50" and "2.75". On the next step, the aperture 91h will reveal the numeral "3" and the other apertures in this group will give the indications "3.25", "3.50" and "3.75" in regular succession on the next three steps of the minor lens carrying disc.

If now the major lens carrying disc is held stationary, as by means of the detent 79 heretofore described, and the minor lens carrying disc is moved still further in a clockwise direction, the aperture 91a will again reveal the numeral "0" and the cycle can be repeated. Thus, all of the minor lenses can be superposed in succession on any one of the major lens repeatedly without destroying the accuracy of the indicated readings. The minor lens carrying disc is rotatable in both clockwise and counterclockwise directions and since the indicated reading is dependent only on the relative positions of the discs, the true value will be indicated for all combinations, whether the minor disc be rotated counterclockwise to increase the refractive power or clockwise to decrease the refractive power.

When the detent 79 is disengaged from the adjacent notch 78, the major lens carrying disc will be moved one step at the end of the series of minor lenses. Thus, when the value "3.75" is indicated and the minor lens carrying disc is moved counterclockwise one step further, the zero minor lens is brought in registry with the sight opening and simultaneously therewith, the major lens of plus 4 diopters is brought in registry. When the major lens carrying disc is moved one step in this manner, the row of positive integers "4576" is brought into registry with the sight opening 96, so that the aperture 91a now reveals the numeral "4" rather than the numeral "0". Upon continued rotation of the minor lens carrying disc, the indications "4.25", "4.50" and so on to "7.75" will be given as the minor lens are superposed in succession upon the major lens of plus 4 diopters. When any one of the other positive major lenses is in registry with the line of sight, the operation of the calculating means will be similar to that just described, all of the indications being positioned in the upper portion of the reading opening for those positive values.

As heretofore described, the major lens carrying disc can be moved while the minor lens carrying disc remains stationary. During this operation, the accuracy of the calculating means is not impaired as will be seen from an inspection of Figs. 10 and 11. Assuming that the discs are again placed in the zero position, but instead of turning the minor lens carrying disc 46, the major lens carrying disc 49 is turned. If the disc 49 is turned in a counterclockwise direction one step, the major lens of plus 4 diopters will be aligned in the sight opening and the row of numerals "4576" will be moved into the position occupied by the row of numerals "0132", in Fig. 11. The numeral "4" will then register with the aperture 91a, giving a reading of plus 4 diopters which, it will be seen, is the correct indication. If the minor lens of 0.25 diopters happened to be in registry during this movement of the major lens carrying disc, the indication would have changed from 0.25 diopters to 4.25 diopters. The numerals 92 on the major lens carrying disc are so disposed that correspondingly placed numerals in successive positive rows differ from each other by four in every instance. For this reason, the indicated value increases by four diopters when a major lens in any combination is replaced by the next stronger major lens, and conversely, the indicated value decreases by four when any major lens is replaced by the next weaker lens. This feature gives rise to a very important advantage over all prior devices of this character, in that it enables quick clearing of the optometer without introducing any error into the indicated readings.

In the negative indications, the algebraic sum of the superposed lenses in the line of sight is given. Since all of the minor lenses are positive in the embodiment of the invention illustrated and since the highest minor lens has a lower numerical value than the smallest negative major lens, any combination including a negative major lens and one of the minor lenses will have a refractive power of a negative value. Also, since the algebraic sign of the power of each of the lenses entering into the combinations is different from the other, the algebraic sum involves the subtraction of the value of the minor lens from the value of the major lens. The negative numerals 92 (shown in broken lines) on disc 49 and the apertures 91 on disc 46 which cooperate therewith are definitely positioned on their respective discs to accomplish this calculation automatically in a manner which is similar in general to the manner in which it is done in connection with the positive major lenses described above.

Referring again to Figs. 6, 10 and 11, it will be seen that when the aperture 91a is placed in the reading opening 96, the aperture 91w also registers with the reading opening. It was seen that when the major lens carrying disc was moved in a counterclockwise direction, the rows of positive numerals were brought into registry with the aperture 91a or with any one of the other apertures that might have been positioned in the upper portion of the reading opening 96. The positive major lenses when brought into registry with the line of sight do not move any numerals into coincidence with the aperture 91w or with any other aperture which happens to be positioned in the lower portion of the reading opening 96. The numerals 92 associated with negative major lenses, however, cooperate with the apertures placed in the lower portion of the reading opening 96. Thus, when the major lens of minus 4 diopters is moved into the line of sight, the negative row of numerals "01234" is moved simultaneously into the lower portion of the area defined by the reading opening 96. If the aperture 91w happens to be in the position shown in Fig. 6, the negative numeral "4" will be revealed in this aperture, thus indicating that the combined refractive power of the superposed lenses is equivalent to minus 4 diopters. This indication is correct for this setting, since the major lens of minus 4 diopters is superposed on the zero minor lens. It will be noted that no aperture on disc 46 is equidistant with the aperture 91w from the axis of rotation of disc 46, thus indicating that for no other setting of the minor lens carrying disc 46 will the innermost numeral be revealed in each row of negative numerals 92. The reason for this condition has been explained above, that is, there is only one possible lens combination which will include the highest negative integer in each row.

The lowest negative integer in each row will enter into three possible combinations and for this reason the three apertures 91x, 91y and 91z are all equidistant from the axis and are angularly spaced to reveal the lowest numeral for three successive settings of the minor lens carrying disc 46. When, for example, the minor lens carrying disc 46 is turned one step in a clockwise direction from the position shown in Fig. 10, the minor lens of 3.75 diopters will replace the zero minor lens (aperture 48). Simultaneously, the aperture 91x will be moved into registry with the lower portion of the reading opening 96 and the negative numeral "0" will be revealed in the aperture 91x, if the major lens of minus 4 diopters is in registry with the sight opening. The indicated reading, therefore, will be minus 0.25 diopters, which is the algebraic sum of the major lens of minus 4 diopters and the minor lens of plus 3.75 diopters, which are superposed under this condition. When the minor lenses of 3.50 and 3.25 diopters are superposed on the major lens of minus 4 diopters, the apertures 91y and 91z will be moved into the reading opening to give the indications minus 0.50 and 0.75, respectively. Turning the minor lens carrying disc still further in the same direction, the series of apertures beginning with aperture 91k will reveal the negative numeral "1" and will give the negative indications "1", "1.25", "1.50" and "1.75", respectively, as the minor lenses of 3, 2.75, 2.50 and 2.25 diopters are superposed on the major lens of minus 4 diopters. As the minor lens carrying disc is turned still further, the negative indications increase numerically until the zero minor lens 48 is superposed on the major lens of minus 4 diopters to give a reading of minus 4 diopters. On the next clockwise step of the minor lens carrying disc, the minor lens of 3.75 diopters is brought into the sight opening and simultaneously therewith the intermittent drive mechanism between the discs causes the major lens of minus 8 diopters to replace the lens of minus 4 diopters. The aperture 91x will then reveal the negative numeral 4 and the indication given will be minus 4.25 diopters, which, it will be seen, is the correct indication for this setting. Further clockwise rotation of the minor lens carrying disc 46 will cause the indicated values to increase numerically to minus 8 diopters in a regular sequence, having incremets of minus 0.25 diopters, in accordance with the successive settings of the minor lens carrying disc relative to the major lens carrying dic.

An auxiliary reading opening 98 can be provided in the lens housing and the major lens carrying disc 49 has marked thereon a plurality of numerals 99 corresponding to the refractive power of the various major lenses. Each of the numerals 99 is so positioned that when one of the major lenses is in registry with the sight opening, the numeral 99 corresponding to that lens is in registry with the reading opening 98. By glancing at the reading opening 98, therefore, the operator is kept informed of the particular major lens which is in registry with the sight opening at all times. This feature is helpful when the operator desires to approach a particular setting increments of 4 diopters by turning the major lens carrying disc. After the closest major lens has been placed in registry with the sight opening, finer adjustments can be made by superposing thereon the various minor lenses until the exact combination desired is obtained. The reading opening 98 can bear appropriate legends, as is shown in Fig. 6, such as the words "basic lens" and "to clear".

As illustrated in Fig. 8 the axis about which the cylindrical lens carrying disc 33 is rotatable (indicated at 93) is displaced from the axis of rotation of the spherical lens carrying discs 46 and 49 (indicated at 94). Each of the cylindrical lenses 34 on the disc 33 can be brought into registry in the line of sight, however, by turning the disc 33 so that the desired lens occupies the position shown occupied in Fig. 8 by the aperture 95, which represents the cylindrical lens of zero power. From an inspection of Fig. 8 it will be seen that the reading openings 96 and 98 cooperate with those portions of the spherical lens carrying discs 46 and 49 which project beyond the periphery of the cylindrical lens carrying disc 33. By this construction, the cylindrical lens carrying disc can be made as large as desired without interfering with the indicating means on the spherical lens carrying discs and at the same time, means is provided for superposing any one of the cylindrical lenses on the spherical lenses in the line of sight.

In Figs. 17a to 19d, several indicated readings are shown as they appear on the device. Thus, in Fig. 17a the reading "—23.75" is indicated in the reading opening 96 and the negative numeral "24" is indicated in the reading opening 98 to reveal to the operator that the major lens of minus 24 diopters is in registry and that the minor lens of 0.25 diopters is superposed thereon, giving a combined refractive power of minus 23.75 diopters. Fig. 17b shows the indication which is given when the major lens of minus 24 diopters and the zero minor lens are superposed. Fig. 17c illustrates the indication which is given when the major lens of minus 28 diopters is combined with the minor lens of 3.75 diopters.

Figs. 18a to 18d give four successive indications as the minor lens carrying disc is turned in a clockwise direction from the setting in which the major lens of minus 28 diopters is superposed on the zero minor lens. On the first step, the minor lens of 3.75 diopters replaces the zero minor lens and simultaneously the intermittent drive mechanism between the discs causes the major lens of plus 16 diopters to replace the major lens of minus 28 diopters. The indicated reading then appears as it is shown in Fig. 18b, the numeral "16" showing in the reading opening 98 and the calculated value for the combination, that is, 19.75 diopters, showing in the reading opening 96. On the two next successive steps, the minor lenses brought into registry decrease in power in increments of 0.25 diopters to give the calculated values 19.50 and 19.25 diopters, respectively, while the major lens indication of 16 diopters remains unchanged.

Fig. 18e shows how the indications appear when the major lens of plus 12 diopters is caused to replace the major lens of plus 16 diopters in the setting indicated in Fig. 18d. It will be noted that the numeral "16" of Fig. 18d has been replaced by the numeral "12" in Fig. 18e and that the calculated value has changed from 19.25 diopters to 15.25 diopters to correspond with the new combination of lenses.

In Fig. 18f, the major lens carrying disc has been moved from the position indicated in Fig. 18e to the position in which the major lens of —28 diopters is in registry with the sight opening. The indication of the calculated value of the combination of lenses is changed accordingly from plus 15.25 diopters to —24.75 diopters.

Figs. 19a to 19d show the indications as they appear when the minor lens carrying disc remains stationary with the minor lens of 3.75 diopters in registry, while the major lens carrying disc is moved to superpose thereon the lenses of zero, plus 4, minus 4 and minus 8 diopters, respectively.

From the foregoing, it will be seen that the indicating means is dependent only upon the relative setting of the major and minor lens carrying discs and that the true calculated value of the combination of lenses in registry is given at all times, irrespective of whether the major lens carrying disc is moved separately or whether the minor lens carrying disc is moved to the exclusion of the major lens carrying disc or whether both lens carrying discs are moved simultaneously. The calculating means, therefore, is entirely independent of any mechanism which may get out of order and for this reason is literally infallible in its operation.

In Fig. 2 I have shown a device known in the art as a punctometer or ciliary-dynemometer, which is employed for testing the accommodation of the ciliary muscles of the eye. In the form shown, a lens holder 101 is mounted in a relatively fixed position on a bar 102 and an objective 103 which is adapted to be viewed through the lens holder 101 is mounted on a bracket 104. The bracket 104 is secured to a member 106 which is slidable longitudinally along the bar 102. For adjusting the distance between the lens in holder 101 and the objective 103 a gear 107 is journalled on the member 106 which meshes with a rack 108 formed along the under side of bar 102. An actuating knob 109 carrying a pinion 111 which meshes with the gear 107 can be employed for effecting movement of the objective 103 relative to the bar 102. The portion of the bar 102 on which the objective mounting is slidable is preferably rectangular in cross section while one end 112 of the bar 102 can be made circular in cross section to fit within a tubular socket 113 (Fig. 1) on the optometer. A groove or channel 114 can be cut adjacent the opening 113, the sides of which are adapted to snugly embrace the corresponding sides of the rectangular portion of the bar 102 when the end 112 of the punctometer is fitted within the opening 113. The parts are so designed that when the punctometer is positioned in this manner, the lens in holder 101 and the objective 103 are accurately disposed in the line of sight of the optometer. After the punctometer has been mounted in the line of sight, the operator moves the objective 103 along the bar 102 until the patient can recognize characters of a certain size marked on the objective. The position of the objective is then noted by the operator and thereafter the movement of the objective 103 is continued in the same direction until the characters again fade away. The range within which the characters are visible indicates to the operator the accommodation of the ciliary muscles of the patient's eye which is being tested. The accommodation of the ciliary muscles has been found to bear a definite relationship to a person's age, and the normality or abnormality of the ciliary muscles can be determined by the presence or absence of this relationship. Accordingly, the bar 102 can be graduated in suitable units to indicate the accommodation of the ciliary muscles and can also be graduated in age units so that a comparison can be made. If desired, a chart 116 can also be marked on the punctometer which gives the normal accommodation of the ciliary muscles for various ages. By providing a mounting on the optometer for the punctometer whereby the ciliary muscles can be tested after defects in the patient's eyesight have been corrected by the setting of the lenses in the optometer, it is apparent that a more accurate and more reliable test of the ciliary muscles is obtained. Also, this arrangement affords an opportunity to provide corrections in the lens prescription to offset the abnormality of the ciliary muscles, when the abnormality is of such a nature that it is subject to correction. These advantages are not present when the punctometer has a mounting which is separate and distinct from the optometer, since in that case it is necessary to test the ciliary muscles while the patient's eyesight remains uncorrected in other respects, or else the patient's eyes must be fitted with lenses prepared under the presumption that the ciliary muscles are normal. In the latter instance, if a correctable abnormality appears, it is sometimes necessary to prepare an entirely new set of lenses in order to correct the patient's eyesight for abnormal accommodation. It will be seen that the punctometer mounting which I have provided enables ready detachment of the punctometer from the remainder of the instrument, whereby the punctometer can be removed, if desired, while the other tests are being made.

In Fig. 4 a device 117, known in the art as a Stevens phorometer is shown and the improved manner in which I prefer to mount this phorometer on the optometer is also illustrated. Briefly, the Stevens phorometer comprises a pair of prismatic lenses 118, one for each eye, and suitable means is provided for rotating the lenses to afford an arrangement for testing the extra ocular muscles of the eye. In the form shown, each of the lenses 118 is mounted in a ring gear 119 (Fig. 15

1) and an idler pinion 121 meshes with both of the gears 119, whereby both lenses 118 are caused to rotate in unison whenever rotation is imparted to one of the lenses.

The improved mounting which I have provided for the phorometer comprises a bracket 122 which is hinged or pivoted as at 123 to a relatively stationary member 124 which is held in place by friction pins 126 extending into complementary sockets 127 in the optometer frame. When the bracket 122 is in the position shown in Figs. 1 and 4, the lenses 118 are disposed in the line of sight of the respective lenses in the optometer. A shoulder 128 can be formed on the member 124 which serves as a limiting stop for the bracket 122 and preferably the shoulder 128 is so designed that when the bracket 122 bears against the same, as shown in Fig. 4, the lenses 118 are in proper operative position. The hinge connection 123 enables the phorometer to be swung upwardly in the manner indicated by the arc shown in Fig. 4 to a non-interfering position when it is not in use. This mounting permits the phorometer to be carried by the optometer at all times so that it is available at any instant and also, the lenses 118 are not exposed to breakage or other accidental damage to the extent that they would be if the phorometer were entirely detached from the optometer.

In Fig. 4 a head rest 131 is shown against which the patient's forehead may be placed while his eyes are being tested. A suitable adjusting screw 132 enables adjustment of the head rest in the most convenient position.

In Fig. 5 a convenient mounting is illustrated for a number of special lenses. Each of these special lenses is carried by an arm 133 which is mounted for rocking movement about the rod 134 in which the tubular socket 113 for the punctometer is formed. The mounting of the arms 133 is such that any one of the special lenses or any combination thereof can be rocked into the line of sight or can be rocked to a non-interfering position outside of the line of sight, as may be desired.

Summarizing briefly the operation and functions of the various parts of the instrument, when the operator desires to bring a particular cylindrical lens into registry with the sight opening 27, the knob 38 (Fig. 6) is turned and the value of the various cylindrical lenses 34 is indicated in the reading opening 43, as each lens is brought into registering position. To turn the cylindrical lens in registry about its own axis, the knob 39 is turned and the pointer 42 indicates the angular adjustment of the lens on the scale 41. To bring a particular one of the major spherical lenses into registry, the knob 69 (Figs. 14 and 15) is turned, the value of the major lens in registry being indicated at the reading opening 98 (Fig. 6). Any one of the minor spherical lenses can be superposed on the major spherical lens in registry by turning the disc 46 by engaging the projecting portion of the periphery thereof, shown in Fig. 6. The calculated value of the combined refractive powers of the spherical lenses in registry is given at the reading opening 96. The Stevens phorometer 117 can be swung into operative position in the line of sight at any time merely by rocking the same about its hinge 123. Any one of the special lens mountings shown in Fig. 5, can likewise be brought into the line of sight whenever desired. The punctometer shown in Fig. 2 can be placed in operative position merely by inserting the end 112 thereof into one of the sockets 113 provided for this purpose.

While I have shown and described a preferred embodiment of my ophthalmological instrument, it is to be understood that I do not wish to be limited thereto, since the invention as defined in the appended claims can be embodied in a plurality of other forms.

I claim:

1. In a device of the character described, a pair of superposed relatively rotatable lens carrying discs, one of said discs being provided with a plurality of apertures and having numeral markings adjacent certain ones of said apertures, the other of said discs having numeral markings cooperating with the numeral markings of the first disc and visible through the apertures therein, the numerals on both discs when read together as a single number indicating the calculated value of an optical characteristic of the combination of lenses derived from the relative setting of said discs.

2. In a device of the character described, a pair of superposed relatively rotatable lens carrying discs, one of said discs being provided with a plurality of apertures and having decimal numeral markings adjacent certain ones of said apertures, the other of said discs having integral numeral markings cooperating with the decimal markings of the first disc and visible through the apertures therein, the integral and decimal numerals on said discs when read together as a single number indicating the calculated value of an optical characteristic of the combination of lenses derived from the relative setting of said discs.

3. In a device of the character described, a pair of superposed relatively rotatable lens carrying discs, one of said discs being provided with a plurality of apertures and having decimal numeral markings adjacent certain ones of said apertures, the other of said discs having integral numeral markings cooperating with the numeral markings of the first disc and visible through the apertures therein, certain ones of the integral numerals having a distinguishing characteristic to indicate that such numerals are negative while the remaining integral numerals are positive, the integral and decimal numerals on said discs when read together as a single number indicating the calculated value of an optical characteristic of the combination of lenses derived from the relative setting of said discs, and the nature of the integral numerals entering into the indication indicating the algebraic sign of the calculated value.

4. In a device of the character described, a pair of superposed relatively rotatable lens carrying discs, one of said discs being provided with a plurality of apertures and having decimal numeral markings adjacent certain ones of said apertures, the other of said discs having integral numeral markings cooperating with the numeral markings of the first disc and visible through the apertures therein, a housing having a reading opening therein, certain ones of said apertures registering with one portion of the reading opening and the other apertures registering with another portion of the reading opening, the integral and decimal numerals on said discs when read together as a single number indicating the calculated value of an optical characteristic of the combination of lenses derived from the relative setting of said discs, and the position of the indictation relative to the reading opening indicating the algebraic sign of the calculated value.

5. In a device of the character described, a pair of superposed relatively rotatable lens carrying discs arranged concentrically, one of said discs being provided with a plurality of apertures spaced at different radii from the center of the disc and the outer face of said one disc having decimal numeral markings adjacent certain ones of said apertures, one face of the other of said discs having integral numeral markings cooperating with the decimal markings of the first disc and visible thru the apertures therein, detent means for retaining said disc in any one of a plurality of predetermined angular relative positions, and a relatively stationary face plate having an aperture for viewing a limited area of the outer face of the first disc, the integral numerals when viewed thru the opening in the face plate and thru the exposed opening in the first disc, and when read together with the decimal numerals viewed thru the opening in the face plate, giving the calculated value of the optometric characteristics of the combination of lenses derived from the setting of the discs.

6. In a device of the character described, a pair of superposed relatively rotatable lens carrying discs arranged concentrically, one of said discs being provided with a plurality of apertures spaced at different radii from the center of the disc and the outer face of the same disc having decimal numeral markings adjacent certain ones of said apertures, the number of said apertures being at least twice the number of lenses carried by said disc, one face of the other of said discs having integral numeral markings cooperating with the decimal markings of the first disc and visible thru the apertures therein, detent means for retaining said discs in any one of a plurality of predetermined angular settings, and a relatively stationary face plate having an aperture for viewing a limited area of the outer face of the first disc, said openings being of sufficient size that the area viewed includes more than one of said apertures, the integral numerals when viewed thru the opening in the face plate and thru the exposed openings in the first disc, and when read together with the decimal numerals viewed thru the opening in said base plate, giving the calculated value of the optometric characteristics of the combination of lenses derived from the setting of the discs.

7. In a device of the character described, a movable member carrying a series of minor lenses, a second movable member carrying a series of major lenses, intermittent drive mechanism interconnecting said movable members for moving said major lens carrying member one step after the last lens of the series of minor lenses is reached, whereby the entire series of minor lenses can be superposed in succession on successive major lenses in turn, said drive mechanism including a max-torque releasable clutch in said intermittent drive connection, whereby the major lenses can be moved while the minor lens carrying member remains stationary.

8. In a device of the character described, a rotatable member carrying a series of minor lenses, a second rotatable member carrying a series of major lenses, intermittent drive mechanism interconnecting said movable members for moving said major lens carrying member one step after the last lens of the series of minor lenses is reached, whereby the entire series of minor lenses can be superposed in succession on successive major lenses in turn, a max-torque releasable clutch interposed in said drive mechanism, and releasable locking means for holding said major lens carrying member stationary, whereby the minor lens carrying member can be rotated repeatedly without causing rotation of the major lens carrying member.

9. In a device of the character described, a rotatable member carrying a series of minor lenses, a second rotatable member carrying a series of major lenses, a casing for said members having a sight opening with which the lenses of said members are adapted to register, a rotatable part having a continuous gear drive to the major lens carrying member, a second rotatable part having an intermittent drive connection of the Geneva type with the minor lens carrying member, clutch mechanism forming a max-torque releasable drive connection between said parts, said clutch mechanism being automatically engageable only in spaced angular positions between said parts corresponding to the extent of angular movement of the first-mentioned part to cause a successive major lens to be brought into registry with the sight opening, said clutch mechanism when engaged enabling intermittent rotation of the major lens carrying member by rotation of the minor lens carrying member, and manually operable means for applying rotational movements to the first mentioned part whereby the major lens carrying member can be rotated to bring successive major lenses into registry with said sight opening without causing rotation of the minor lens carrying member.

CLYDE L. HUNSICKER.